(12) United States Patent
Richardson et al.

(10) Patent No.: US 6,311,986 B1
(45) Date of Patent: Nov. 6, 2001

(54) SEAL JOINT BETWEEN INTERNALS AND PRESSURE VESSEL INLET FOR SEPARATOR ARRANGEMENT

(75) Inventors: Robert A. Richardson, Harris County; George S. Millas, Houston, both of TX (US)

(73) Assignee: Hudson Products Corporation, Houston, TX (US)

( * ) Notice: Subject to any disclaimer, the term of this patent is extended or adjusted under 35 U.S.C. 154(b) by 0 days.

(21) Appl. No.: 09/250,080

(22) Filed: Feb. 15, 1999

(51) Int. Cl.[7] ............................................. F16L 17/06
(52) U.S. Cl. ................................. 277/608; 277/616
(58) Field of Search ................................. 277/335, 342, 277/606, 607, 608, 609, 616; 285/349, 350

(56) References Cited

U.S. PATENT DOCUMENTS

| | | | |
|---|---|---|---|
| 3,238,538 | * 3/1966 | Turner | 277/609 X |
| 3,545,794 | * 12/1970 | Wise et al. | 285/349 X |
| 4,479,656 | * 10/1984 | Collins | 277/606 X |
| 5,071,140 | * 12/1991 | Quevedo Del Rio | 277/608 |

* cited by examiner

Primary Examiner—Robert J. Sandy
Assistant Examiner—Karlena D. Schwing
(74) Attorney, Agent, or Firm—Robert C. Baraona; Eric Marich

(57) ABSTRACT

A seal joint for an arrangement for separating a gas and liquid mixture, the arrangement having a vessel with an inlet for entry of the gas and liquid mixture and an outlet for exit of a separated gas, and a centrifugal separation cyclone in the vessel for centrifugally separating the gas from the mixture. The vessel includes an internal tubular member having an open end and an inlet tube having an open end extending toward the open end of the internal tubular member. A seal joint ring is fixed to the open end of the internal tubular member. The ring has an annular trough which is open toward the open end of the inlet tube and a gasket is provided in the trough and is engaged by the open end of the inlet tube for sealing the open end of the inlet tube to the open end of the internal tubular member.

1 Claim, 1 Drawing Sheet

SEAL JOINT BETWEEN INTERNALS AND PRESSURE VESSEL INLET FOR SEPARATOR ARRANGEMENT

FIELD AND BACKGROUND OF THE INVENTION

The present invention relates, in general, to separation systems and, in particular, to a new and useful seal joint for a separator for separating multiple phase mixture into separate vapor and liquid phases utilizing pairs of centrifugal cyclone separators.

Most of the known gas/oil separation systems rely on natural or gravity separation which requires large vessels to achieve the desired separation performance. When natural separation is used in a relatively small vessel, the throughput or vapor flux of that system is significantly smaller when compared to other systems not relying on natural separation. An example of a system which uses natural separation is described in U.S. Pat. No. 4,982,794.

One known separation system is disclosed in U.K. Patent Application No. GB 2 203 062A and uses centrifugal separation for a primary separation stage and inertial separation (i.e., scrubbers) for a second stage of separation. Although this system most likely has higher separation capacities than a system relying on natural separation, it most likely has higher separation capacities than a system relying on natural separation, it most likely has less capacity when compared to a system that could employ centrifugal separation for both stages.

U.S. patent application Ser. No. 08/337,359, filed Nov. 10, 1994, abandoned in favor of Continuation U.S. Pat. application Ser. No. 08/695,947, filed Aug. 13, 1996, the text of which are hereby incorporated by reference as though fully set forth herein, discloses an improved separator which uses centrifugal separation modules for the primary and secondary stages of separation.

SUMMARY OF THE INVENTION

An object of the present invention is to provide a seal joint which establishes an effective seal between the internals of the gas/liquid or gas/oil separator, and the pressure vessel inlet for the separator.

Accordingly, another object of the invention is to provide an arrangement for separating a gas and liquid mixture, the arrangement having a vessel with an inlet for entry of the gas and liquid mixture and an outlet for exit of a separated gas, and centrifugal separation means in the vessel for centrifugally separating the gas from the mixture; the improvement comprising: the vessel including an internal tubular member having an open end; an inlet tube having an open end extending toward the open end of the internal tubular member; a seal joint ring fixed to the open end of the internal tubular member, the ring having an annular trough which is open toward the open end of the inlet tube; and a gasket in the trough engaged by the open end of the inlet tube for sealing the open end of the inlet tube to the open end of the internal tubular member.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
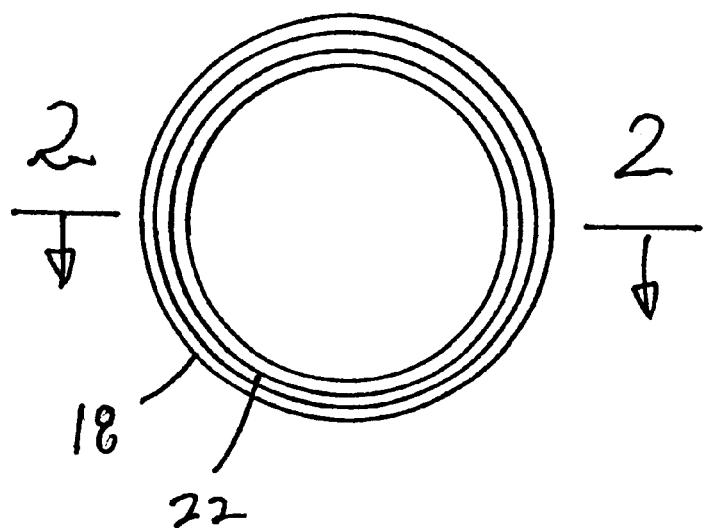
FIG. 1 is a top plan view of a retaining ring forming the main element of the seal joint of the present invention.
Figure 2:
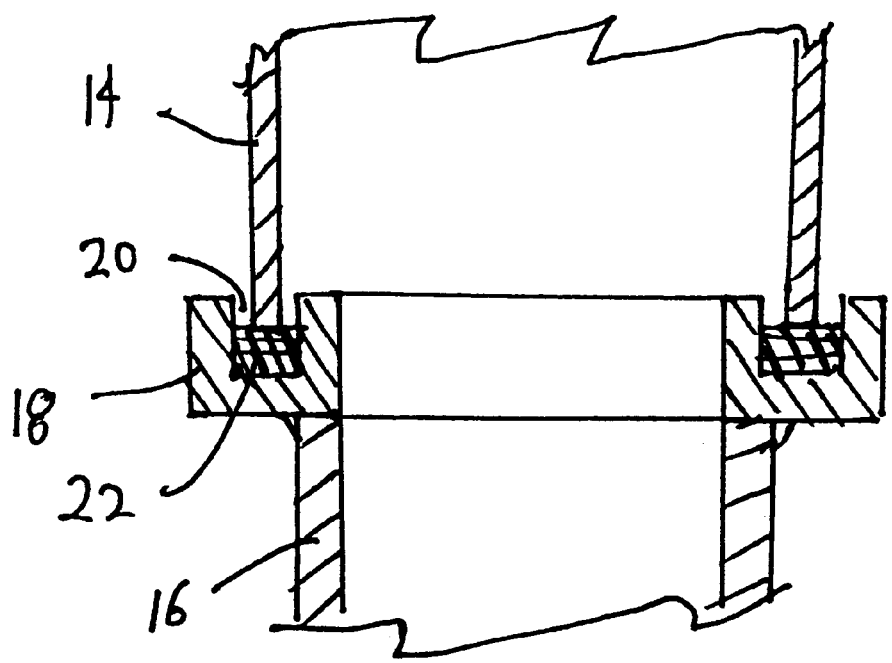
FIG. 2 is a sectional view taken along line 2—2 of FIG. 1 including also the internals and inlet for the separator.

The present invention illustrated at FIGS. 1 and 2 replaces the commercial flange used in gas/oil separators to date and instead, connects a separator inlet tube 14 to an internal tubular structure 16 in the gas/oil separator, with an annular retaining ring 18 having an annular, upwardly open trough 20, containing a gasket material 22, against which the open end of tube 14 is held. Ring 18 is fastened to the upper end of tubular internal structure 16, for example, by welding. The seal joint of the present invention realizes several advantages. The joint can accommodate manufacturing tolerances in the length of the internals by varying the thickness in the axial direction of gasket 22. The gasket may, for example, be made up of flat washer shaped layers which are stacked one above the other with a number of layers being selected to accommodate the proper depth for gasket 22. The seal joint of the invention also provides for ease of installation and removal for replacement. The invention accommodates the internal separation of inlet and outlet structures and increases the storage capacity for the separator vessel.

Conventional high temperature gasket material can be used for gasket or gasket rings 22.

While a specific embodiment of the invention has been shown and described in detail to illustrate the application of the principles of the invention, it will be understood that the invention may be embodied otherwise without departing from such principles.

We claim:

1. In a vertically oriented arrangement for separating a gas and liquid mixture, the arrangement having a vessel with an inlet for entry of the gas and liquid mixture and an outlet for exit of a separated gas, and centrifugal separation means in the vessel for centrifugally separating the gas from the mixture; the improvement comprising:

the vessel including an internal tubular member having an open end;

an inlet tube having an open end extending toward the open end of the internal tubular member, the end of the inlet tube being free from any mechanical joining devices and also being free from any coupling grooves;

a seal joint ring fixed to the open end of the internal tubular member, the ring having an annular trough which forms an essentially vertically-oriented receiving space for the open end of the inlet tube, the receiving space being free from any mechanical joining devices and also being free from any coupling grooves; and at least one gasket disposed in the receiving space of the trough, the gasket being in contact with the open end of the inlet tube thereby sealing the open end of the inlet tube to the open end of the internal tubular member.

* * * * *